2,791,512

REMOISTENING ADHESIVE COMPOSITION AND A SHEET COATED THEREWITH

Raymond S. Hatch and Walter B. Roberson, Palatka, Fla., assignors to Hudson Pulp & Paper Corp., New York, N. Y., a corporation of Maine Application March 27, 1953, Serial No. 345,240

14 Claims. (Cl. 106—208)

This invention relates to adhesive compositions. More particularly it relates to adhesive compositions which are especially suited for the manufacture of gummed tape of the type wherein the gummed tape is re-moistened prior to use.

In the art of making gummed tape, it has long been considered highly desirable, and in some cases essential, to use varying quantities of animal or fish glues in adhesive compositions to be applied to the tape. In gummed tape wherein the adhesive composition is applied to a paper or fabric surface as an aqueous solution or dispersion, then dried and, when used, is remoistened with water, it is required that the adhesive coating immediately develop strong tack or adhesive properties, and set up quite rapidly to form a tenacious bond. While animal or fish glues are useful for gummed tape adhesive compositions due to their rapid adhesive properties on remoistening, their relative freedom from a tendency to slip or slide on surfaces to which they are applied and their considerable cohesion while wet, still they also suffer from certain disadvantages. Important among these disadvantages are the relatively high cost of animal or fish glues, the variations in their properties as a result of the raw material sources and methods of manufacture thereof, and often their rather objectionable odor.

It is an object of our invention to provide adhesive compositions and sealing tapes or papers which are free from the difficulties and disadvantages indicated. More specifically, it is an object of our invention to provide adhesive compositions which are less expensive than glues, which wet rapidly and have high adhesive strength so that they are suitable for manufacturing gummed tape, which have no objectionable odor and yet which have good aging characteristics. Other objects and advantages of our invention will be in part pointed out and in part implied hereinafter.

In one of its broader aspects, our invention may be said to lie in starchy, adhesive compositions for gummed tape which contain substantial quantities of amylopectin and which are substantially free of amylose; additionally said compositions have what we may term "intermediate" viscosities. That is to say, the viscosities of said adhesive compositions range between about 2,000 to 20,000 centipoises at 125° to 130° Fahrenheit and at solid concentrations of about 40% to 60%.

While our invention is designed to overcome practical problems in the adhesive industry and it is not intended that it be limited by a discussion of theoretical chemical aspects, nevertheless perhaps the features of our invention may be more fully realized if we discuss certain of the theoretical principles we presently believe to be applicable to the invention.

Most starches are composed of two high polymers. Amylose, which is one of these, is a substantially straight chain polymer composed of glucose units which are united by a 1–4 alpha glucosidic linkage. The other component of starches is commonly known as amylopectin; it also is a high polymer but is a branched rather than a straight chain compound.

It has been recognized that ordinary unconverted starches may be converted or partially hydrolyzed so that when used as an adhesive composition practically immediate solution of the adhesive occurs on re-moistening to thereby yield rapid adhesion. In such hydrolysis, the viscosity of the starch solution or dispersion is lowered to the point sought so that it may be applied to the surface of the paper or fabric in the liquid form. In the past considerable attention has been directed to the conversion of starch, the adjustment of the viscosity thereof by such conversion and the use of addition agents to increase or to decrease the starch viscosity as desired.

So far as we are presently aware, none of these variations have been successful in eliminating the need for the more expensive yet objectionable animal or fish glues in the more severe adhesive uses, such as on gummed remoistening tapes. One of the more serious drawbacks of previous modified or converted starch compositions, with or without natural glues or addition agents has been their excessive loss of adhesive properties on aging.

We believe that the amylose molecules are, to a considerable degree, responsible for the poor aging and adhesion characteristics of prior starchy adhesive compositions. When amylose, or partially hydrolyzed amylose, is heated in water, swelling occurs and, under proper conditions, partial solution is achieved. And, when this solution is applied to paper, or another surface, and dried, it possesses considerable adhesive properties immediately after drying. On standing, however, these adhesive properties of the amylose are greatly diminished; we believe this loss of adhesive power is caused by the close association of the long chain amylose molecules, due probably to hydrogen bonding or cross linking. Because of this close association, water is not absorbed at normal room temperature and the adhesive coating fails to swell and regain a significant part of its original adhesive power.

In contrast, we have found that amylopectin may be swelled in water and dried, after which it readily absorbs water and swells again, even at relatively low temperatures. We presently believe that the branched-chain structure of amylopectin prevents the molecular chains from becoming closely associated to the extent that they will not swell and absorb water at normal room temperatures.

In the practice of our invention, we employ starches substantially free of amylose but rich in amylopectin. Among starches which meet this requirement are starches from waxy maize (Amioca) and waxy sorghum, although amylopectin-rich starches derived from other sources (such as corn starch) may also be used. It should be noted that for satisfactory adhesive properties and for application to paper on conventional roller coating machines, the viscosity of the amylopectin starch composition is to be adjusted and maintained within a predetermined range.

The viscosity and solubility characteristics needed may be obtained in a variety of manners or by combinations of individual manners. For example, we may add to the adhesive solution or dispersion certain water binding products or viscosity depressing compounds such as urea, sodium nitrate, zinc chloride and other water soluble salts of the alkali or alkaline earth metals. Also, one may resort to a high degree of conversion or dextrinizing or hydrolysis of the amylopectin-rich starch by known methods such as treatment with acid, oxidation, enzyme action and heat treatment. In another aspect of our invention, one may use amylopectin derivatives such as hydroxyethyl or carboxymethyl amylopectin starches.

Additionally, we may include certain percentages (up to about 30%) of ordinary converted corn starch or corn dextrins, though increasing quantities of these materials decrease the adhesive properties of the adhesive composition and result in some retrogression on aging. Again, one may add certain quantities of animal glue to the amylopectin-rich adhesive, though such addition is accompanied by a tendency for the dried tape to curl. Generally speaking, the lower viscosity solutions made according to our invention exhibit less adhesive power. While not essential, the use of addition agents, as set forth above, permits a lesser conversion of the starch while still achieving high tack.

The features of the invention may perhaps better be appreciated by reference to the following specific examples:

Example I

We made up an adhesive material which had a total solids content of 55% and a viscosity of 6700 centipoises at 125° F. by mixing the following components in the proportions indicated by weight:

65%—converted amylopectin having a viscosity of 30 cps. in 20% solution at 130° F.

10%—converted amylopectin having a viscosity of 886 cps. in 20% solution at 130° F.

25%—sodium nitrate

Water—in a quantity sufficient to give a total solids content of 55%.

When coated on a suitable paper, this composition gave a gummed tape having a McLaurin test of 75 to 80. After aging this tape at 140° F. for 26 days, no loss in the McLaurin test was experienced. The McLaurin test is a standard test in the gummed paper industry for determining the adhesive powers or qualities of water or solvent activatable gummed tapes. In the test procedure a 4 inch strip of gummed tape is activated and applied to Kraft paper. After drying, the tensile force necessary to remove the tape from the Kraft paper is measured.

Example II

We added 100% converted amylopectin (having a solution viscosity of 30 centipoises in 20% solution at 130° F.) to water in a quantity sufficient to yield, upon heating, a solution containing 45% total solids and having a viscosity of 3180 centipoises at 125° F. This solution, when coated on suitable paper, gave a McLaurin test above 75; after 26 days of aging at 140° F., no loss in the McLaurin test was observed.

While in the foregoing specification, we have set forth certain specific embodiments of the invention and the manner of their use, these are not intended to be exhaustive or limiting of the invention which is defined in the appended claims, but on the contrary these examples have been selected with a view to illustrating the principles of the invention so that others skilled in the art may understand the invention and how best to adapt it and with modifications and variations, each as may be best suited to the requirements of a particular use.

We claim:

1. A remoistening adhesive composition which comprises an intimate mixture of water and dextrinized amylopectin which is substantially free of amylose, said mixture containing about 40 to 60% solids and having a viscosity between about 2,000 and 20,000 centipoises at about 125°–130° F.

2. A remoistening adhesive composition according to claim 1 containing a water-soluble viscosity depressing compound.

3. A remoistening adhesive composition according to claim 2 wherein said compound is sodium nitrate.

4. A remoistening adhesive composition according to claim 2 wherein said compound is urea.

5. A remoistening adhesive composition according to claim 2 wherein said compound is zinc chloride.

6. A remoistening adhesive composition according to claim 1, said amylopectin having been dextrinized by acid treatment.

7. A remoistening adhesive composition according to claim 1, said amylopectin having been dextrinized by heat treatment.

8. A gummed adhesive tape which comprises a flexible backing coated with an amylose-free amylopectin, the amylopectin having been applied to said sheet as an aqueous dispersion having a viscosity of between about 2,000 to 20,000 centipoises at about 130° F.

9. A gummed adhesive tape according to claim 8 wherein said aqueous dispersion contains about 40–60% solids.

10. A gummed adhesive tape according to claim 9 wherein said dispersion also contains sodium nitrate.

11. An adhesive sheet which comprises a flexible film coated with an amylose-free amylopectin, the amylopectin having been applied to said sheet as an aqueous dispersion having a viscosity of between about 2,000 to 20,000 centipoises at about 130° F.

12. An adhesive sheet according to claim 11 wherein said aqueous dispersion contains about 40–60% solids.

13. A remoistening adhesive composition which comprises an intimate mixture of water and dextrinized amylopectins which are substantially free of amylose, said mixture containing about 55% total solids and having a viscosity of about 6700 centipoises at 125° F., said solids in said mixture being comprised of 65% of a dextrinized amylopectin having a viscosity of 30 centipoises as measured in 20% solution at 130° F., 10% of a dextrinized amylopectin having a viscosity of 886 centipoises as measured in 20% solution at 130° F., and 25% sodium nitrate.

14. An adhesive sheet which comprises a paper coated with the adhesive composition of claim 13.

References Cited in the file of this patent

UNITED STATES PATENTS

| | | |
|---|---|---|
| 1,268,672 | Bloede | June 4, 1918 |
| 2,102,937 | Bauer | Dec. 21, 1937 |
| 2,319,637 | Schopmeyer et al. | May 13, 1943 |
| 2,338,083 | Buchanan et al. | Jan. 4, 1944 |
| 2,424,546 | Bauer et al. | July 29, 1947 |
| 2,515,096 | Schoch | July 11, 1950 |
| 2,589,313 | Wood | Mar. 18, 1952 |
| 2,594,273 | Mellwig | Apr. 29, 1952 |

OTHER REFERENCES

Craig: Abstract of Application Ser. No. 606,278, published Feb. 14, 1950.

Zonnenberg: "Indian Textile Jour." LXI, March 1951, pages 410, 411 and 412. (Dept. of Agr. Library.)

Caldwell: "Section of the Technical Association of the Pulp and Paper Industry," pages 27, 28 and 29.

Schopmeyer et al.: Jour. Ind. & Eng. Chem. 35, 1169–72 (1943).

Kerr: "Paper Trade Jour." 115, pages 30–34.

Gruzewerke: "Comptes Rendus" 152, 785–8 (1911).

Kerr: "Chemistry and Industry of Starch" (1944), 252, 258 and 435.

The Merck Index 6th ed. (1954), pp. 883, 884, 988 and 1019.